(No Model.)
J. A. LITTLE.
SPADE OR SHOVEL.
No. 400,923. Patented Apr. 9, 1889.
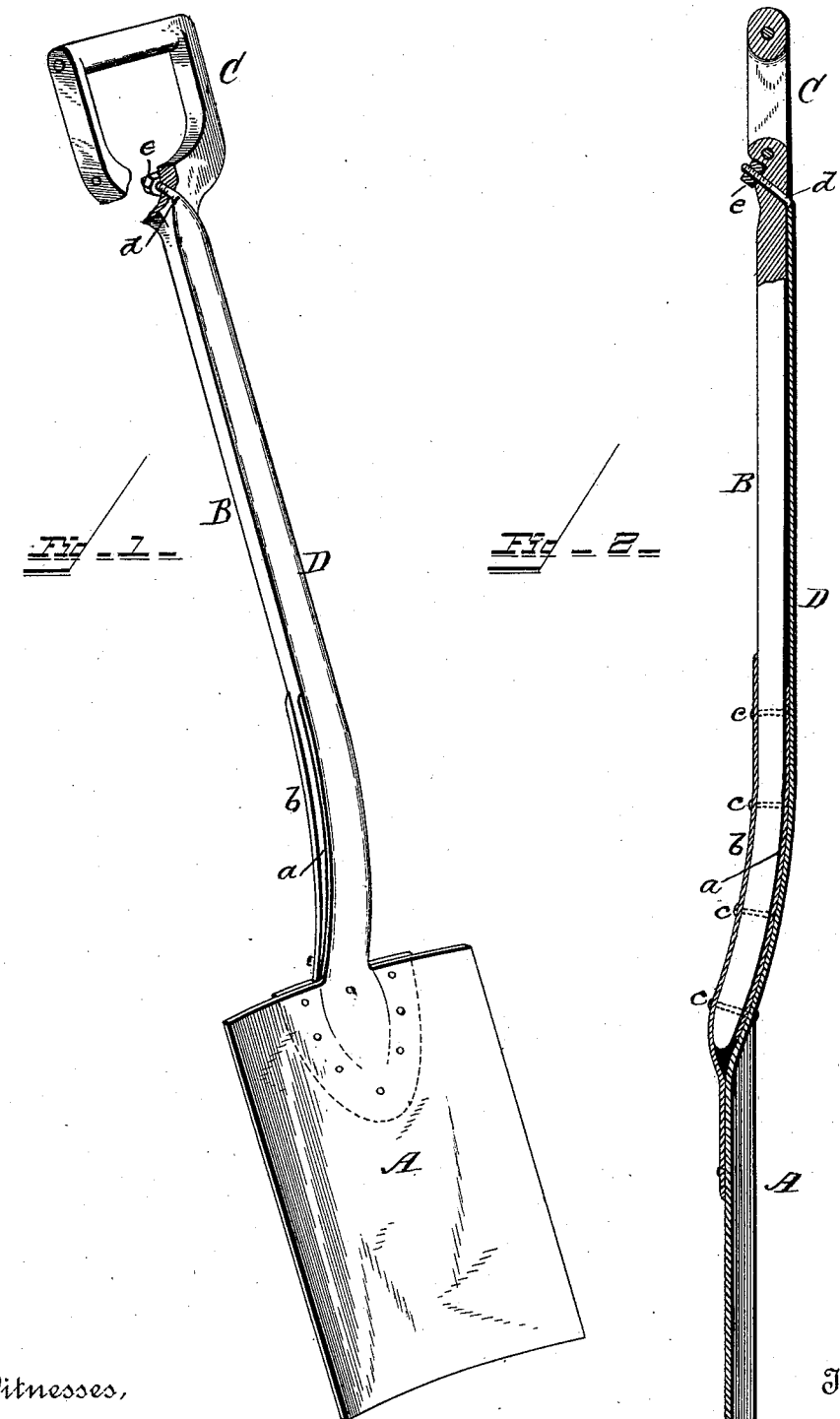
Witnesses,
Albert Speiden,
Chas. B. Good.
Inventor,
James A. Little,
By his Attorney
Chas. H. Fowler

UNITED STATES PATENT OFFICE.

JAMES A. LITTLE, OF CARTERSBURG, INDIANA.

SPADE OR SHOVEL.

SPECIFICATION forming part of Letters Patent No. 400,923, dated April 9, 1889.

Application filed August 9, 1888. Serial No. 282,328. (No model.)

*To all whom it may concern:*

Be it known that I, JAMES A. LITTLE, a citizen of the United States, residing at Cartersburg, in the county of Hendricks and State of Indiana, have invented certain new and useful Improvements in Spades and Shovels; and I do hereby declare that the following is a full, clear, and exact description of the same, reference being had to the annexed drawings, making a part of this specification, and to the letters and figures of reference marked thereon.

Figure 1 of the drawings is a perspective view of my improved shovel or spade, showing the handle partly broken away; and Fig. 2, a longitudinal central section thereof.

The present invention has for its object to provide a shovel or spade that will possess superior strength and be less liable to break or become injured by continued use; and the invention consists in a shovel or spade constructed substantially as shown in the drawings, and hereinafter described and claimed.

In the accompanying drawings, A represents the blade of the shovel or spade, and B the handle, which terminates in a handle or hand-grasp, as shown at C, and of the usual construction.

Extending from the blade A are straps $a$ $b$, of sufficient length to pass some distance up on the handle B upon its upper and under sides, respectively, and secured thereto by suitable bolts or rivets, $c$, as shown in Fig. 2. These bolts or rivets, passing through the handle B, tend to greatly weaken it, and frequently the handle will split or break at the point where the rivets pass through. In order to remedy this weakening of the handle and the liability of its splitting or breaking, I provide what I term a "tension-strap," D, of sufficient length to extend the entire length of the handle upon the upper side thereof, said strap terminating in a screw-bolt, $d$, which passes through the handle C, and a nut, $e$, engaging therewith, as shown. The strap D is preferably formed concavo-convex, to conform to the shape of the handle in cross-section. As will be noticed, the screw-bolt $d$ passes through the hand-grasp C at an oblique angle, thereby allowing tension to be secured by turning the nut in the proper direction. This will completely take the downward strain off the handle, thereby rendering it much stronger and more durable, with but little additional weight.

It should be noticed that the straps $a$ $b$ are independent of the blade A of the shovel, while the strap D is integral therewith, the strap $b$ being riveted at its lower end to the shovel-blade and both the straps riveted to the handle, as shown.

Having now fully described my invention, what I claim as new, and desire to secure by Letters Patent, is—

The combination, with a shovel or spade, of a tension-strap extending the entire length of the handle, and terminating in a screw-bolt which extends obliquely through the same, and a nut engaging with the bolt, whereby the necessary tension of the strap may be had, substantially as and for the purpose set forth.

In testimony that I claim the above I have hereunto subscribed my name in the presence of two witnesses.

JAMES A. LITTLE.

Witnesses:
  J. W. LITTLE,
  JAMES L. CLARK.